(12) United States Patent
Kargman

(10) Patent No.: US 8,212,833 B2
(45) Date of Patent: Jul. 3, 2012

(54) SECURE COMPUTER SCREEN ENTRY SYSTEM AND METHOD

(75) Inventor: James B. Kargman, Chicago, IL (US)

(73) Assignee: IPDEV Co., Chicago, IL (US)

( * ) Notice: Subject to any disclaimer, the term of this patent is extended or adjusted under 35 U.S.C. 154(b) by 574 days.

(21) Appl. No.: 12/391,593

(22) Filed: Feb. 24, 2009

(65) Prior Publication Data

US 2009/0213132 A1    Aug. 27, 2009

Related U.S. Application Data

(60) Provisional application No. 61/031,115, filed on Feb. 25, 2008.

(51) Int. Cl.
| | |
|---|---|
| G06F 3/041 | (2006.01) |
| G06F 3/00 | (2006.01) |
| G06F 3/048 | (2006.01) |
| G09G 5/00 | (2006.01) |
| G06K 9/32 | (2006.01) |
| G06K 9/36 | (2006.01) |

(52) U.S. Cl. ........ 345/581; 345/619; 345/672; 345/689; 345/173; 382/276; 382/292; 382/295; 382/301; 715/700; 715/773; 715/764

(58) Field of Classification Search .................. 345/581, 345/619, 660–661, 672, 684, 685–689, 156, 345/168, 169–173; 358/452–454; 382/254, 382/276, 286–292, 295–301; 715/700, 773, 715/764, 780, 788–800, 831, 864
See application file for complete search history.

(56) References Cited

U.S. PATENT DOCUMENTS

| | | | | |
|---|---|---|---|---|
| 2005/0071637 A1* | 3/2005 | Shirakawa | .................... | 713/170 |
| 2005/0076310 A1* | 4/2005 | Tada | .............................. | 715/838 |
| 2005/0261059 A1* | 11/2005 | Nguyen et al. | .................. | 463/40 |
| 2005/0273498 A1* | 12/2005 | Sasaki et al. | .................. | 709/206 |
| 2006/0274036 A1* | 12/2006 | Hioki et al. | .................. | 345/156 |
| 2007/0192705 A1* | 8/2007 | Lee | ................................ | 715/739 |
| 2008/0167081 A1* | 7/2008 | Eng | .............................. | 455/566 |
| 2009/0019188 A1* | 1/2009 | Mattice et al. | .................. | 710/17 |
| 2009/0082107 A1* | 3/2009 | Tahara et al. | .................. | 463/37 |
| 2009/0125429 A1* | 5/2009 | Takayama | ....................... | 705/35 |

* cited by examiner

Primary Examiner — Wesner Sajous
(74) Attorney, Agent, or Firm — Schiff Hardin LLP

(57) ABSTRACT

A method for entering secure data at an input device includes displaying a graphical input region having input elements, such as a number keypad, and receiving selections of the input elements via a display selection device, such as a mouse or touch screen. An attribute of the displayed graphical input region is changed so that inputs by the display selection device change for the same data input. Examples include changing the position, size and/or layout of the input elements and/or graphical input region. The graphical input elements may instead be provided with two characters so that typing one character results in input of the corresponding character, and then changing the association of the characters on the displayed input elements.

17 Claims, 4 Drawing Sheets

20

SECURE COMPUTER SCREEN ENTRY SYSTEM AND METHOD

CROSS-REFERENCE TO RELATED APPLICATION

This application claims the benefit of U.S. Provisional Patent Application Ser. No. 61/031,115, filed Feb. 25, 2008, which is incorporated herein by reference.

BACKGROUND OF THE INVENTION

1. Field of the Invention

The present invention relates generally to an apparatus and method for entering data of a sensitive nature in a secure manner, and in particular to a method and apparatus for entering data at a computer terminal or other device to avoid detection of the data being entered.

2. Description of the Related Art

It is known that secure data, such as credit card information or username and password information, is vulnerable to theft. Key logger programs can be surreptitiously placed on a computer system into which such information is entered. Such key logger programs are programmed to capture keyboard entries as keystrokes and store the keystroke information in a hidden file on the system. Based on some triggering event, such as an external inquiry or the expiration of a timer, the contents of the hidden file are transferred to a remote location where it can be analyzed.

Although such data simply represents un-delineated keystrokes, the data collected by the key logger program can be analyzed with sophisticated tools and the secure data can be extracted. Thus, the presence of a key logger program or other similar program on a system can result in a compromise in the security of the computer system, or a disclosure of credit card information, bank account information, or other sensitive data of a secure nature.

SUMMARY OF THE INVENTION

The present invention provides a method and apparatus for addressing the issue of secure data capture by avoiding the entry of secure data using the keyboard. It achieves this result through the use of a graphical image of a data input element on a display that prompts user input of the secure data via a mouse or other pointing device or via a touch screen or the like for entry of sensitive data. Instead of entering the secure data via the keyboard, the data is entered as one or more selections by the mouse or other pointing device of selectable elements of the data input element. For added security, the position, size and/or orientation or other attributes of the graphical image of the data input element are varied to avoid correlating position information of the selections of the selectable elements with data being entered by the user.

DETAILED DESCRIPTION OF THE PREFERRED EMBODIMENTS

Figure 1:
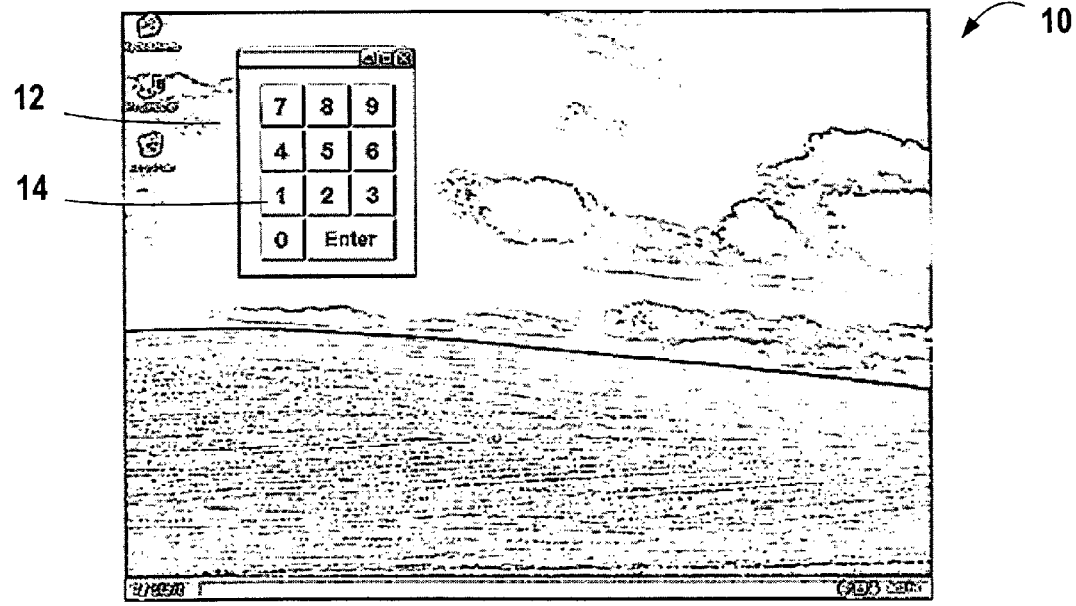
FIG. 1 is a screen shot of a display screen of a computer or workstation showing a graphical data entry element according to the principles of the present invention.

Beginning first with FIG. 1, a display screen 10 of a computer or workstation is shown. The display screen 10 provides a graphical user interface, or GUI, using graphical elements to convey information to a user. The display screen 10 may be on a desktop or laptop computer, workstation or terminal interface, in either a public or private location, at a home or at a business, a library or other location. The user of the computer may be seeking to purchase an item on-line by entering credit card information while using an Internet browser on the computer, or may be logging into a bank account or other financial account, or may be logging into a secure site for work, or other activity resulting in the entry of sensitive information. The display screen 10 may instead be provided on a mobile telephone, personal data assistant, portable media player or gaming device, or other device. Further, the data display screen 10 may be provided on household or office equipment, at a manufacturing plant or business, and may find particular utility at locations where secure data is routinely entered such as at an automatic teller machine, at an entry door of a secure area, at an automated ticket terminal of an airport, at a checkout lane of a store, or the like. The present system may also be used to ensure security of data entered for example on an operating panel of a computer operated or controlled system, such as a medical imaging system, an automated manufacturing system, or any number of displays or terminals. The display may be provided on any input device. The scope of the invention is not limited by the device or system on which the display is provided.

The display screen in the example of FIG. 1 illustrates a typical desktop graphical display on the display device 10 of a computer system on which the secure data will be entered. In the example, the desktop display, also referenced 10, is provided by the user interface of the Microsoft Windows XP operating system, although any other display and user interface can be used, including an Apple operating system interface, Linux operating interface, or other operating system or interface. The desktop display 10 may include many different graphical elements, such as a background picture, icons denoting programs or files, or shortcuts to programs, folders or files, a task bar or other graphical elements. The display 10 may also show operating programs, such as in a window or otherwise. On the display 10, a data entry region 12 is provided. In the illustrated exemplary embodiment, this data entry region 12 is a Microsoft Windows dialog box. The data entry region 12 in some embodiments may be displayed as a window or other portion of the display, or may even occupy all of the display device area. The dialog box 12 comprises data entry elements 14, which are exemplified here by graphical elements depicting push buttons labeled with numbers. In particular, the data entry region 12 is an illustration of a number key pad. The elements 14 are used by the user to enter individual alphanumeric characters.

Preferably, the user does not use the keyboard to enter the secure information, but rather uses a mouse, touch pad, joystick or other pointing device or a touch screen or other selecting device to select data entry elements 14 within the data entry region 12. The pointing devices include a mouse, touch pad, joystick, tablet, trackball or other input device, either as a stand alone device or as part of a keyboard or console. These typically move a pointer on the display and permit selection of an item to which the pointer is directed. The touch screen, on the other hand, permits direct entry on the display by touch using a stylus, finger or other item. Both the pointing device and touch screen may be considered display element selecting devices. This term encompasses all such devices which permit this function to be performed.

The entry of the information using the pointing device or other display element selecting device prevents a keystroke grabber program from intercepting the keys that are pressed on a keyboard. It is also important that what is displayed on the data entry elements 14 is created in graphical form. This prevents a program from reading the contents of the displayed element 14 and intercepting the information in this manner. Key logging programs do not typically register entries by a pointing device, but even if it did the selection would only identify a location on the display, such as by X and Y coordinates, and not as an alphanumeric character.

For purposes of illustration, the computer user may be using the computer to access an on-line sales site on the Internet to purchase goods or services and is asked to enter user information such as name, address, and a credit card number to complete the transaction. The browser or other program receives the name and address information in the known way via the keyboard but upon reaching the step of entering the credit card number, the present method and apparatus causes the graphical user interface to display the data entry region 12, for example as a dialog box, for entry of the credit card number. The present method and apparatus disables entry of data for the credit card number via the keyboard in the preferred embodiment. A warning or instructions may be provided to the user cautioning against use of the keyboard to enter the credit card number and instructing the user to use the mouse or other pointing device to select the data entry elements 14 of the data entry region 12 in order to enter the credit card number. The user operates the mouse or other pointing device to select the data entry elements 14 in sequence corresponding to the user's credit card number. Thereafter, the browser program may again accept input from the keyboard to complete the transaction, or to take other actions. The credit card number entry has thus not been captured by a possible key logging program on the computer. The data entry region 12 may also appear for entry of other sensitive information during the on-line purchase.

It can be readily seen that this method and apparatus can be used by the computer user for entry of secure log-in information to access bank account data, to conduct financial transactions, access secret or other secure information, or otherwise ensure against access to sensitive data. The example above describes use with an Internet browser program, but the method and apparatus may be used with other programs, log-in elements of programs, or as a stand-alone data entry apparatus or method.

The displayed data entry elements 14 are represented by, for example, a bitmap or other graphical representation of a number keypad. If such data entry elements were displayed in the same location, orientation and size each time, it might be possible that an interception program could deduce, over time or with predefined knowledge, the alphanumeric characters represented by a position of the data entry elements 14. Therefore, a preferred embodiment of the invention varies different attributes of the data entry region 12. The variation in the attributes of the data entry region 12 may be provided each time the data entry region appears, after a random number of appearances of the data entry region, or even after selection of one or more data entry elements 14 as the sensitive data is being entered.

Figure 2:
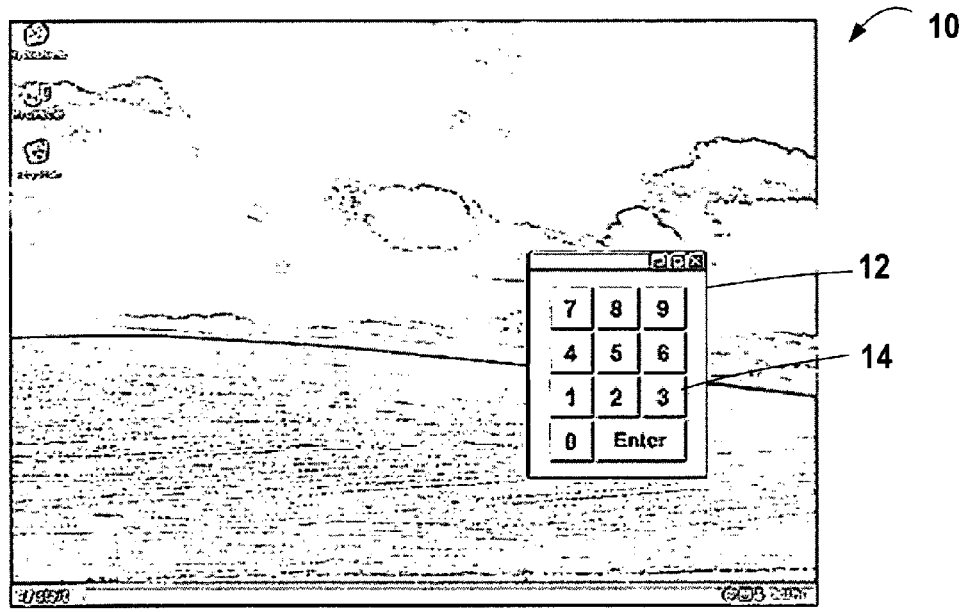
FIG. 2 is a screen shot of the display screen of FIG. 1 showing the graphical data entry element moved to a different location on the screen.

As can be seen in FIG. 2, the position of the data entry region 12 with respect to the display has been changed from the position shown in FIG. 1. Capture of the selection of a number "4" for instance on the keypad of FIG. 2 would result in a different X and Y coordinate than selection of number "4" on the keypad of FIG. 1. A program capturing selections of data entry elements 14 that have been moved about on the display 10 would be unable to deduce the data being entered by the selection. Thus, one attribute that can be changed is the location of the data entry region 12 on the display. The data entry region 12 may be moved horizontally, vertically, or to any other position on the display. As with any of the attributes, the position can be varied according to a random number generator, one-time, pad, or other predefined list of positions or offsets. This position could change each time an alphanumeric sequence is entered, after entry of several number sequences, or even during entry of a number sequence. The change in position may be according to some designated pattern.

Figure 3:
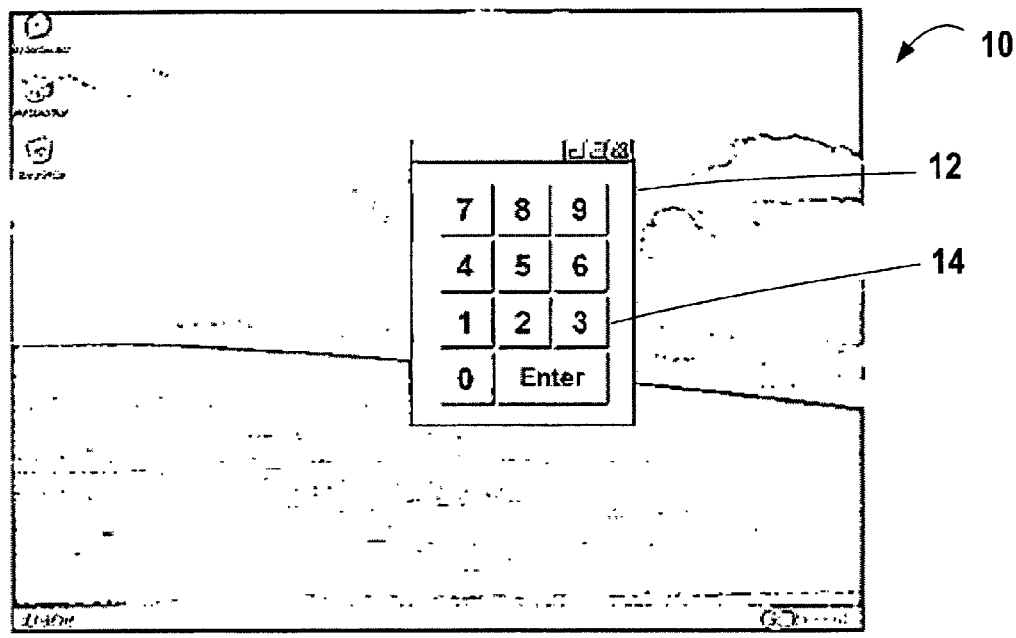
FIG. 3 is a screen shot of the display screen of FIG. 1 showing the graphical data entry element enlarged as compared to FIG. 1.
Figure 4:
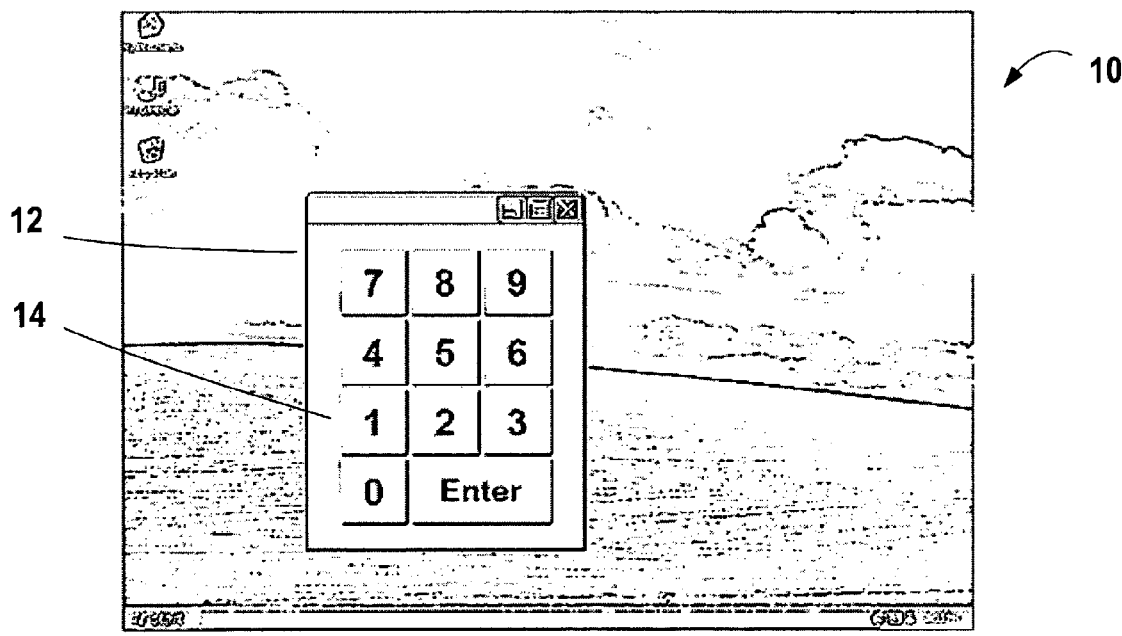
FIG. 4 is a screen shot of the display screen of FIG. 1 showing the graphical data entry element moved and enlarged as compared to prior figures.

FIGS. 3 and 4 illustrate another attribute that can be varied, that is, the size of the data entry region 12 on the display 10. In FIG. 3, the data entry region 12 is larger than that shown in FIGS. 1 and 2. In FIG. 4, the data entry region 12 is larger still. The change in the size of the data entry region 12 also changes the size of the data entry elements 14 proportionally, so that there is no longer a correspondence between the X and Y coordinates for a given data entry element 14 as between the different sizes of data entry regions 12. The data entry region 12 can also be decreased in size. The changes in size can be consistent as to all the data entry elements 14 of the data entry region 12 so that all data entry elements change in side proportionately, or some data entry elements 14 can change in size while other data entry elements change in size disproportionately, remain the same size as prior to the attribute change, or changed in size in the opposite direction. As illustrated in FIG. 4, the data entry elements 14 have changed in proportion to the data entry region 12, however, it is also possible that the data entry elements 14 and data entry region 12 could vary in a non-proportional manner, or that one can vary without the other. In one embodiment, the data entry region 12 occupies all of the display 10 and is changed to occupy only a portion of the display 10 after an attribute change, or vise versa.

In addition to the changes in location of the data entry location 12 as shown in FIGS. 1 and 2, the data entry location 12 can also be changed in size, as shown in FIGS. 3 and 4. Thus, two attributes are varied in the display at a time. As noted above, the change in attribute may be made after each alphanumeric sequence, after a plurality of alphanumeric sequences, or even during entry of an alphanumeric sequence.

Figure 5:
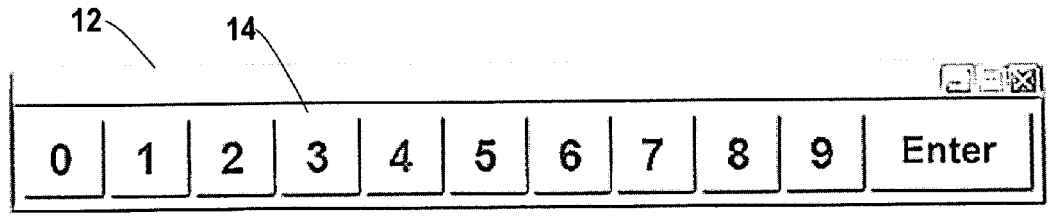
FIG. 5 is a graphical data entry element for use on a display screen according to the present invention.

FIG. 5 shows an embodiment in which the layout of the data entry elements 14 in a data entry region 12 is changed. In particular, the data entry elements 14 are arranged in a linear manner instead of the grid arrangement of the preceding figures. The linear arrangement of the data entry region 12 may be horizontal, vertical or diagonal, and may extend across the display 10 at the top, middle, bottom, right side, left side, or otherwise. Thus, in the data entry region of FIG. 5, the attribute that is varied is the arrangement or the layout of the data entry region 12. It is also possible to change the arrangement of the data entry elements 14 within the data entry region 12, or to change both the layout of the data entry region 12 and the arrangement of the data entry elements 14 within the data entry region 12. It is within the scope of the invention that the arrangement could be a configuration other than the grid or linear arrangement shown.

The data entry elements 14 need not be continuous with one another but can be spaced apart from each other or can be arranged in rows or columns that are spaced apart from other rows or columns. The data entry elements 14 may be in clusters or groups which are adjacent or spaced from one another. The data entry elements need not be rectangular push-button elements but could be circular, triangular or some other regular or irregular shape. The data entry elements can have nearly any appearance and need not look like a button. The layout attribute changes can be made alone or along with changes in the size attribute and/or the location attribute of the elements 14 and/or display 12. The layout attribute can be changed at each alphanumeric sequence, during a sequence entry or after a plurality of alphanumeric sequences have been entered.

Figure 6:
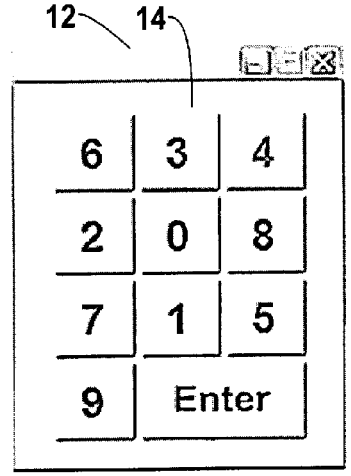
FIG. 6 is a further graphical data entry element for display on a display screen.

As can be seen in FIG. 6, the buttons 14 are arrayed in a similar grid as that shown in FIG. 1, but with the arrangement of the digits within the grid has changed. For example, the "5" button is moved from the center to the lower right, whereas the "9" button is moved from the upper right to the lower left. A random rearrangement of the data entry elements 14 has therefore been made. The rearrangement of the data entry elements 14 may be performed along with changes in other attributes, for instance size, location and layout, and can be made per each alphanumeric sequence entry, in the course of an alphanumeric sequence entry, or after entry of a plurality of sequences. Thus, any combination of display attributes changes may be made at any point in the entry of the sensitive data.

Figure 7:
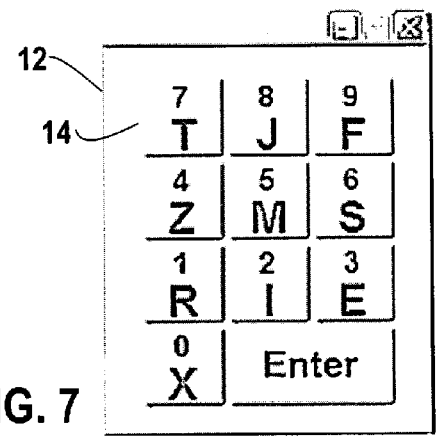
FIG. 7 is yet another graphical data entry element according to the present invention.

FIG. 7 illustrates an embodiment of the data entry region 12 in which each data entry element 14 shows both a number and a letter. This embodiment retains the use of keyboard entry for entry of a numeric sequence and could be used where it would be difficult to utilize a graphical pointing device, such as a mouse. In this embodiment, numeric values that are to be entered, such as a credit card number, are entered by keyboard entry of the corresponding letter associated with each number. The user enters the number sequence by typing the corresponding letters on the keyboard. Each number sequence to be entered, or even during entry of the number sequence, the letters on the number buttons 14 are changed. The letters are preferably assigned randomly, so that if the key intercept program were to record the keystrokes, the keystrokes would be meaningless since the letters are randomly assigned to the numeric values. In an embodiment permitting use of the keyboard, changes in the display attributes would not result in changes in information captured by an intercept program, so the preferred use of this embodiment is that the display attributes remain constant and only the letters assigned to the numbers change.

Figure 8:
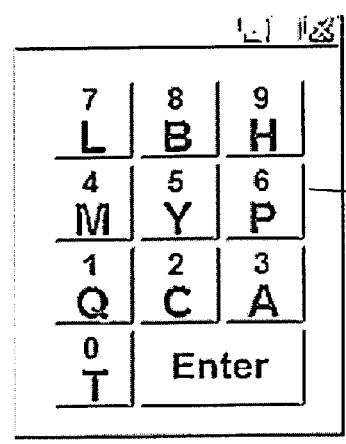
FIG. 8 is yet a further graphical data entry element of the invention.
Figure 9:
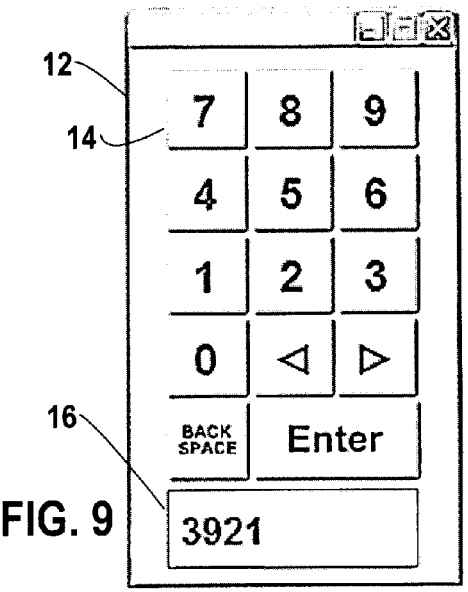
FIG. 9 is another embodiment of the graphical data entry element.

FIG. 8 illustrates a changing of the letters associated with the numeric values of the data entry elements 14 compared to FIG. 7. The corresponding letters and numbers can be changed upon completion of entry of an entire string that could be terminated, for example, by hitting the enter button. Alternately, the changing of the letters could be done with every keystroke, or according to some predefined pattern, or even a random pattern. It should be noted that this is not limited to the entry of numeric data, but rather any alphanumeric data could be entered provided that a random mapping of a different keystroke character is used to input the alphanumeric string.

As an alternative, any alphanumeric character may correspond to any other alphanumeric character, so that on an expanded data entry region 12 having a greater number of data entry regions 14 could permit the user to enter text using the keyboard to enter the corresponding alphanumeric character. Similarly, an expanded data entry region 12 could permit selection of displayed data entry elements 14 for text and numbers for any of the embodiments described herein.

For lengthy strings, it may be advantageous to include an entry display region 16 within which the entered values can be displayed. The entry display region 16 displays entries as they are made so that the user may more easily determine where what digits in the sequence have been entered so far. However, in a preferred embodiment, this display region 16 is generated graphically so that it is less susceptible to interception by a logging program.

Various techniques could be further employed in order to prevent a graphical analysis of the display and/or data of the display. For example, fonts which are readable by the user yet are difficult to convert to text using OCR (optical character recognition) technology could be utilized, or noise elements could be deliberately introduced into the graphical display of these elements. The shapes of the data entry elements 14 could be varied as well.

The display of characters in the entry display region 16, or on another region of the display, may display a code rather than the actual number being entered. The displayed information may be a random or include an overlay graphic so that a display monitoring routine in the computer will be unable to read bit patterns moved to the display buffer as the numbers are displayed. Thus, if a data sniffer program were on the computer looking for patterns that represent displayed numbers, the data sniffer would be unable to discern the number or other data being displayed.

If the data is displayed as a dynamically variable graphical element or a vector graph or a compound document of varying size or location, the display data appears random to a program monitoring the display data. The graphical elements should not be standard graphical elements. The displayed data may be subject to lossy compression to avoid detection, or the characters may be pixilated by pulling random data from the displayed data. The resulting display may appear imperfect to the viewer but would still be readable. Adding do-called garbage data or pixels to the display as long as it is a relatively minor amount would leave the displayed information readable to a user.

Figure 10:
FIG. 10 is a graphical display of an alphanumeric sequence including several distortion factors for a number string.

For example, the data string may be entered as graphical elements of different colors, of different sizes, of different shapes and orientations. An example of such an altered number string for the sequence 3921 is shown in FIG. 10. The numerals 20 of the sequence are each of a difference size and are each presented in a different orientation. The numerals "3" and "9" are provided with a thickness and are shown turned relative to the viewer. The "3" is viewed from below and the "9" is tilted. The numerals 2 and 1 are shown without turning, but the numeral "2" is tilted. The numeral "1" is not tilted or turned, but is provided with a border. In the preferred embodiment, the numerals are of different colors and different shading. The "3" and "2" are provided with shaded background blocks. Additional shading is provided on the "3" and "9" at the edges. Overlaying patterns may be provided within or even extending from the numbers onto the background space. The foregoing may be considered examples of display distortion factors that can be applied to displayed data.

The resulting graphic display of the number sequence is not readily detected as a number sequence by graphic monitoring programs. To prevent alphanumeric sequences to be deduced from long term monitoring of the display data stream, the factors for modifying the appearance of the numbers are changed from time to time, and preferably each time a given numeral is displayed. For instance, the graphical display of a given numeral may include different backgrounds, different colors, different tilts, different overlay patterns, different angles or thicknesses of three dimensional numerals, as well as other factors.

A further factor for modifying the bit count of the display is to "punch holes" in the display of the alphanumeric characters, by leaving out bits on the graphic display of the character sequence. The removed data may be individual bits of information or larger "holes" in the displayed graphic. The removal of random or non-random bits or holes in the displayed graphic of the alphanumeric sequence changes the data information that might be recorded by a display monitoring program but the user may still be able to determine what number or letter sequence is being displayed. The graphical display modification or distortion factors are preferably randomly applied to the alphanumeric sequence, so that the same numeral is not displayed in the same way with the same graphical modifications or distortions each time it is shown. The distortions result in a different bit pattern and/or bit count each time a given numeral is displayed.

The distortion factors may be applied much more severely or heavily than is possible for a display where the user has to read the displayed information and understand it or at least repeat it by typing the information to the computer. The heavily distorted display may be understood by the user since the user knows the credit card information, for example, that is to be input. The knowledge of the number before hand by the user enables reading of the heavily distorted information because the user knows what is expected. The user may only need to determine the number of digits entered so far or the identity of the last digit entered and need not be able to read all of the digits.

It is even possible that the distortion factors or graphical modification factors for the displayed data change during the course of displaying a given display sequence.

These measures may be used to keep the data stream going to and/or from the user or client workstation from being read, or sniffed, by a monitoring program. The number data may have a so-called signature that could be used to detect the numbers being displayed. Altering the data to distort the signature prevents identification of the numbers. No identifying patterns are present in the data to disguise the data.

In yet another embodiment of the invention, additional security could be provided in that the data that is entered by the user could be directed to more than one destination. Such split data could then be recombined by another entity in order to enhance the security. Thus, part of a credit card number string, for example, is transmitted to one location while another part of the credit card number string is transmitted to another location. Other forms of splitting of the data are of course possible and are included within the present invention.

Furthermore, the data could be entered from two separate devices or two separate locations, where the attributes that are varied can be synchronized. In such a system, it is also possible that the split data for entry must be entered by two different individuals, so that no one person has all of the secure data when entering and would be capable of compromising this information. When the data must be entered on two or more different systems, the chances of a hacker compromising the two or more systems is extremely remote to the extent that, from a practical standpoint, it is impossible.

It is also possible to incorporate a mixing of two different types of data entry when the data is split. For example, alternate entry mechanisms could be provided, such as voice input and DTMF tone entry, for the entry of part of the data, again, making it exceptionally difficult or impossible for an unauthorized user to access all needed parts of the data in order to compromise it.

In an additional embodiment, which could be used, e.g., for disabled people with limited vision, or who must, for some other reason, use the keyboard for input, the user may be prompted via an audio stream provided to them with information that would allow them to use alternate key sequences to represent numbers on the screen.

In this embodiment, for example, instead of using the top row of number keys, the user could be instructed to use the next 1, 2 or 3 lower rows instead of the actual numeric entry. The system could also add additional "garbage" characters to the resultant data string, and then remove those "garbage" characters algorithmically so that without access to the algorithm, a monitor of the data would not be able to determine the actual number entered.

The audio response system used by the disabled person's representative, could speak the "converted number value" or the real value for feedback purposes. For example, the user could be prompted with, "ROW 1", and thus for the number "1", the user would type a keyboard letter from row 1 corresponding to "1", and could type the letter "Q"—for conformational purposes, the system would then speak back the number "1" to confirm that the right key was pressed. In this example, if the system prompted, "Row 2", then the user would type the "A" key (of the second row of a QWERTY keypad) for the number "1".

As noted above, the system could be instructed to insert random data into the string. This entry of random data would be as close to the keyboard device driver as possible so that any unauthorized keystroke logging program would not be able to discern keyboard entry from the random data that is entered. However, if the above identified encoding were followed, the necessity of this implementation would be lessened.

For example, for a 16 digit number, such as a credit card number, the string, with random data inserted, may appear as follows:

QQWRETRYUIPRWQEQWRQOOOQEYTYU-UUUIPUPIUEWRERWRWE RWE

The system, since it knows what algorithm was followed to enter the random data into the string, would be able to extract from this the actual keystrokes from the user, which might be QRYUIPOOWER or 14678099234.

The row equivalent values on a standard QWERTY keyboard are as follows:

Row 0 1234567890
Row 1 Qwertyuiop
Row 2 Asdfghjkl;
Row 3 Zxcvbnm,./

Although it is clear that other keyboard layouts could be implemented as well.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The system may use any form of processor and comprise a memory, data storage, and user interface devices, such as a graphical display, keyboard, barcode, mouse, or any other known user input or output device. The system may also be connected to other systems over a network, such as the Internet, and may comprise interfaces for other devices. The software that runs on the system can be stored on a computer-readable media, such as tape, CD-ROM, DVD, or any other known media for program and data storage.

Although other modifications and changes may be suggested by those skilled in the art, it is the intention of the inventors to embody within the patent warranted hereon all changes and modifications as reasonably and properly come within the scope of their contribution to the art.

I claim:

1. A method for receiving secure data at an input device having a display, comprising the steps of:
    displaying data entry elements on the display of the input device, respective ones of the data entry elements being displayed at a first selection position;
    receiving a selection of a data entry element at the first selection position via a display element selecting device, said selection corresponding to data input of one or more alphanumeric characters of a character sequence of the secure data;
    automatically changing a display attribute of the data entry elements shown on the display, the changed display attribute including displaying at least one of the data entry elements at a second selection position on the display, said second selection position being at a different position on the display than the first selection position; and
    receiving a selection of a data entry element with the changed display attribute at the second selection position, said selection corresponding to data input of one or more alphanumeric characters as subsequent characters of the character sequence of the secure data.

2. A method as claimed in claim 1, wherein said step of changing the display attribute of the data entry elements changes a position of at least one data entry element on the display.

3. A method as claimed in claim 2, wherein said step of changing the display attribute changes a position of a plurality of the data entry elements on the display.

4. A method as claimed in claim 2, wherein said step of changing the display attribute changes a size of the data entry elements on the display.

5. A method as claimed in claim 2, wherein said step of changing the display attribute changes a layout of the data entry elements on the display.

6. A method as claimed in claim 2, wherein said data entry elements are displayed in a data entry region, and wherein said step of changing the display attribute changes one of the attributes selected from the group consisting of: position of the data entry region, size of the data entry region, layout of the data entry region, and position of the data entry elements within the data entry region.

7. A method as claimed in claim 6, wherein said data entry region includes a graphical depiction of a number entry keypad, and said data entry elements are graphical depictions of buttons of the number entry keypad.

8. A method as claimed in claim 1, wherein said step of changing the display attribute is performed following entry of a first portion of a predetermined sequence of data by selection of corresponding ones of the data entry elements, so that the data entry elements are shown with a different display attribute for entry of a further portion of the predetermined sequence of data.

9. A method as claimed in claim 8, wherein said predetermined sequence of data is a credit card number.

10. A method of receiving secure data at an input device having a display, comprising the steps of:
    displaying a data entry region on the display of the input device, said data entry region including data entry elements, the data entry region and data entry elements being displayed according to a first display attribute;
    receiving a selection of one or more of said data entry elements via a display element selecting device, said selection corresponding to data input of one or more alphanumeric characters of the secure data;
    upon receiving a predetermined sequence of alphanumeric characters as data input in said receiving step, automatically changing the display attribute of at least one of said data entry region and said data entry elements to a second display attribute, said step of automatically changing the display attribute changes at least one of the attributes selected from the group consisting of: position of the data entry region, size of the data entry region, layout of the data entry region, and position of the data entry elements within the data entry region; and
    receiving a further selection of one or more of said data entry elements via a display element selecting device, said selection corresponding to data input of one or more further alphanumeric characters of the secure data.

11. A method of entry of secure data at an input device having a display, comprising the steps of:
    displaying data entry elements on the display, the data entry elements being labeled with first alphanumeric characters and being labeled with corresponding second alphanumeric characters;
    receiving a selection via a keyboard of a first alphanumeric character data element, said selection being received by the input device as a corresponding second alphanumeric character;
    automatically changing the displayed data entry elements on the display so that the data entry elements labeled with the second alphanumeric characters are provided with different corresponding first alphanumeric characters; and
    receiving a selection via the keyboard of the different first alphanumeric character as a corresponding second alphanumeric character.

12. A method as claimed in claim 11, wherein said first alphanumeric characters are letters and said second alphanumeric characters are numbers.

13. A method as claimed in claim 11, further comprising the steps of:
    displaying data elements with distortion factors applied to the alphanumeric display.

14. A system including a computer having a computer readable media containing a computer program which when operating on the computer performs a method comprising the steps of:
    displaying data entry elements on the display of the input device;
    receiving a selection of a data entry element via a display element selecting device, said selection corresponding to data input of one or more alphanumeric characters;
    automatically changing a display attribute of the data entry elements shown on the display, said display attribute including a selection position of at least one of the data entry elements; and receiving a selection of a data entry element with the changed display attribute, said selection corresponding to data input of one or more alphanumeric characters.

15. A method as claimed in claim 1, further comprising the steps of:
- automatically changing the display attribute of the data entry elements shown in the display to a third selection position following said step of receiving the selection at the second selection position; and
- receiving a selection of a data entry element with the changed display attribute at the third selection position, the selection corresponding to data input of further subsequent characters of the character sequence of the secure data.

16. A method as claimed in claim 10, further comprising the steps of:
- upon receiving said further selection of data entry elements, automatically changing the display attribute of at least one of the data entry region and the data entry elements to a third attribute; and
- receiving a still further selection of one or more of said data entry elements via a display element selecting device, said still further selection corresponding to data input of subsequent sequential characters of the secure data.

17. A system as claimed in claim 14, wherein said computer performs the further method steps of:
- automatically changing the display attribute of the data entry elements shown in the display to a further selection position of at least one of the data entry elements following said step of receiving the selection with the changed display attribute; and
- receiving a selection of a data entry element with the changed display attribute at the further selection position.

* * * * *